(12) United States Patent
Lin

(10) Patent No.: US 7,893,384 B2
(45) Date of Patent: Feb. 22, 2011

(54) SYSTEMS AND METHODS FOR LASER MATERIAL MANIPULATION

(75) Inventor: Shih-Chao Lin, Portland, OR (US)

(73) Assignee: Chosen Technologies, Inc., Portland, OR (US)

( * ) Notice: Subject to any disclaimer, the term of this patent is extended or adjusted under 35 U.S.C. 154(b) by 936 days.

(21) Appl. No.: 11/160,270

(22) Filed: Jun. 16, 2005

(65) Prior Publication Data

US 2006/0119743 A1 Jun. 8, 2006

Related U.S. Application Data

(60) Provisional application No. 60/633,814, filed on Dec. 7, 2004.

(51) Int. Cl.
*B23K 26/00* (2006.01)
*B23K 26/02* (2006.01)

(52) U.S. Cl. .............................. 219/121.68; 219/121.78
(58) Field of Classification Search .. 219/121.6–121.85
See application file for complete search history.

(56) References Cited

U.S. PATENT DOCUMENTS

| | | | |
|---|---|---|---|
| 5,362,940 A | 11/1994 | MacDonald et al. | |
| 5,364,493 A | 11/1994 | Hunter, Jr. et al. | |
| 5,523,543 A | 6/1996 | Hunter, Jr. et al. | |
| 5,932,119 A * | 8/1999 | Kaplan et al. | 219/121.68 |
| 6,605,796 B2 | 8/2003 | Brandinger et al. | |
| 6,605,799 B2 | 8/2003 | Brandinger et al. | |
| 6,657,157 B1 | 12/2003 | Altman et al. | |
| 6,660,964 B1 * | 12/2003 | Benderly | 219/121.74 |
| 6,696,008 B2 | 2/2004 | Brandinger | |
| 6,747,243 B1 * | 6/2004 | Reinhardt | 219/121.69 |
| 6,804,269 B2 | 10/2004 | Lizotte et al. | |
| 6,884,962 B2 | 4/2005 | Lizotte et al. | |
| 6,909,735 B2 | 6/2005 | Lizotte et al. | |
| 7,177,012 B2 | 2/2007 | Bleeker et al. | |
| 7,188,778 B2 * | 3/2007 | Pinson | 235/494 |
| 7,268,935 B2 | 9/2007 | Roberts | |

(Continued)

OTHER PUBLICATIONS

Kai Dou et al, Surface Texturing of Aluminum Alloy 2024-T3 via Femto- and Nanosecond Pulse Excimer Laser Irradiation, IEEE Journal of Selected Topics in Quantum Electronics, vol. 6, No. 4, Jul./Aug. 2000.

(Continued)

*Primary Examiner*—Sang Y Paik
(74) *Attorney, Agent, or Firm*—Jon M. Dickinson, Esq.; Robert D. Varitz, Esq.

(57) ABSTRACT

A laser material manipulation system is provided for material processing, such as laser ablation, laser deposition and laser machining. The system includes a laser for emitting laser pulses and a laser imaging device having an array of controllable imaging elements. The laser imaging device receives the laser pulses emitted from the laser, forms a laser image through the controllable imaging elements, and projects the laser image onto a target material which is to be processed. The projected laser image processes the material according to a desired pattern. The laser can be a femtosecond laser. The laser imaging device can be a liquid crystal display (LCD) or a digital micromirror device (DMD). An SEM can be used for monitoring the material distribution and dynamically adjust the laser image according to the monitor result.

6 Claims, 3 Drawing Sheets

U.S. PATENT DOCUMENTS

| | | |
|---|---|---|
| 7,277,557 B2 * | 10/2007 | Ihara .......................... 382/100 |
| 7,575,999 B2 | 8/2009 | Benson et al. |
| 2004/0102764 A1 | 5/2004 | Balling |
| 2004/0245466 A1 | 12/2004 | Robinson et al. |
| 2005/0067740 A1 | 3/2005 | Haubensak |
| 2005/0077275 A1 | 4/2005 | Stoltz |

OTHER PUBLICATIONS

Seares and Amor, Eds. Applied Laser Tooling. European Intensive Course on AppliedLaser Tooling (Jul. 22-26, 1985, Vigo, Spain), pp. 8-15; 28-31.

* cited by examiner

SYSTEMS AND METHODS FOR LASER MATERIAL MANIPULATION

CROSS-REFERENCE TO RELATED APPLICATIONS

This application claims benefit of an earlier filing date of U.S. provisional patent application, Ser. No. 60/633,814, filed Dec. 7, 2004, entitled "Systems and Methods for Laser Ablation".

BACKGROUND

1. Field of the Invention

The present invention relates generally to systems and methods for laser processing/manipulation, such as laser ablation, and particularly to systems and methods for small scale processes, such as semiconductor inspection, device editing, microsystem modification, sample preparation and MEMS manufacturing using laser.

2. Description of the Prior Art

Laser has been used to manipulate materials in a variety of ways. This includes laser ablation (material removal or a subtraction process), laser deposition (an additive process), laser machining, laser milling, and laser inspection (often combined with laser cutting). Laser is increasingly substituting or supplementing focused ion beam (FIB) milling, and replacing diamond saws in applications such as TEM sample preparation for semiconductor devices.

The phenomenon of laser ablation of a material has been known and studied for years, but the results with older nano-second-regime laser technologies operating at one billionth of a second ($10^{-9}$ sec) would not have sufficed for the small structures of current and near-future silicon-based integrated-circuit technologies and other types of microstructures such as nanotechnology. Lasers operating in the sub-picosecond regime (SPR) have been applied to the ablation of a material, such as silicon. More recently, laser of even shorter pulses, namely femtosecond laser, has started to have applications. These latest lasers promise superior performance and ease of application. In particular, ultrashort laser pulses such as femtosecond laser pulses promise to overcome a very common thermal damage problem associated with older lasers. Typical laser machining using relatively longer pulses tends to leave thermal damage on the micrometer scale. For devices having a size scale near or under micrometers, thermal damage is generally unacceptable. Femtosecond laser promises to eliminate such thermal damages caused during laser ablation. In addition, ultrashort pulsed lasers have also demonstrated potential for fabricating sub-micron features in diverse substrates by taking advantage of the sharp boundaries of optical breakdown created by femtosecond pulses of laser light.

Given the importance of laser manipulation of materials, it is desirable to develop a new laser manipulation system that is faster, more flexible and more accurate.

SUMMARY OF THE INVENTION

This invention improves the existing laser ablation, etc. systems and methods by providing a laser material manipulation system that uses a laser imaging device having an array of individually controllable imaging elements which interact with laser pulses to form a projectable laser image in accordance with a pattern created by control over these elements. Those skilled in the art, from a reading of the disclosure material provided herein, will recognize clearly that the particular types of control elements described in this document are, per se, conventional in their respective constructions and capabilities, and through appropriate control, are each variably interactable with laser pulses throughout and within a "range" of different, and independent, pulse-interaction conditions, such as between (a) a substantially full "off" condition adjacent one end of this range, and (b) a substantially full "on" condition adjacent the other end of the range. The laser imaging device in the system of the present invention receives the laser pulses emitted from the laser, forms a laser image through specifically selected laser-pulse interactions with the controllable imaging elements, and projects the thus formed laser image onto a target material which is to be processed. The projected laser image processes the target material according to a desired processing pattern.

The laser can be a femtosecond laser. The laser imaging device can have a liquid crystal display (LCD), a digital micromirror device (DMD), a digital light processing (DLP) unit, or any similar methods to create a laser image pattern to be projected on the target material. A Scanning Electron Microscope (SEM) can be further used to monitor the material distribution, determine the desired ablation location and light intensity, and dynamically adjust the laser image according to the monitoring result.

In one embodiment, the array of controllable imaging elements are individually controllable, and each controllable imaging element has at least two different statuses, every status effectuating a distinctive optical effect on a laser pulse that interacts with the controllable imaging element. The array of controllable imaging elements may further be addressable by an addressing controller, as that in a video display such as LCD and DLP.

In one embodiment, the laser material manipulation system has an inspection device adapted for monitoring the target material and a feedback loop controller unit for dynamically adjusting the laser image according to a feedback signal from the inspection device. For example, the array of controllable imaging elements may be a two dimensional grid consisted of N×M controllable imaging elements, each controllable imaging element being identified by a pair of coordinates i and j ($i=1, 2, \ldots N$, and $j=1, 2, \ldots M$). The projected laser image is a N×M pixel matrix, each pixel corresponding to one of the controllable imaging elements and having a light intensity $F_{ij}=Q_{ij} \times A_{ij}$, where $Q_{ij}$ is a material factor related to a material distribution and a corresponding material-laser interaction coefficient, and $A_{ij}$ is a manipulation pattern factor determined by a desired manipulation pattern on the target material. The material factor $Q_{ij}$ may be further determined by the material distribution $M_{ij}$ on the target material and the corresponding material-laser interaction coefficient $I_{ij}$ according to $Q_{ij}=M_{ij} \times I_{ij}$. In one embodiment, the material factor $Q_{ij}$ can be selectable from a plurality of values predetermined by pre-known materials involved and the corresponding material-laser interaction coefficients. $A_{ij}$ may have a value of either 0 or 1 to define the ablation pattern.

In one embodiment, a Scanning Electron Microscope (SEM) is used to inspect the target material. The SEM inspects material distribution of the target material, generates material distribution data, and feeds the material distribution data to the laser imaging device, whereby the laser imaging device adjusts the laser image using an imaging controller. In some cases, an optical microscope may also be used to inspect the target material either in place of or in addition to an SEM.

The present invention also provides a laser ablation method. According to the laser ablation method, laser pulses are first generated and directed to a laser imaging device having an array of addressable imaging elements. The laser imaging device forms a laser image through the addressable imaging elements according to a desired laser ablation pattern, and then projects the laser image onto a target material to perform laser ablation according to the desired laser ablation pattern. In some embodiments, the laser pulses are femtosecond laser pulses. The laser imaging device may be a liquid crystal display (LCD), or a digital micromirror device (DMD).

In some embodiments of the method, a material inspection device is used to monitor the target material using a material inspection device, and feed a result of monitoring to the laser imaging device whereby the laser imaging device adjusts the laser image according to the result of monitoring. The material inspection device may be a Scanning Electron Microscope (SEM) adapted for inspecting material distribution of the target material, and to help determine a desired ablation location and light density.

This invention can be used for various types of laser manipulation, including ablation, deposition, laser machining, laser device editing, microstructure inspection, MEMS fabrication, fabrication and prototype design (FPD), nanotechnology developments, and semiconductor manufacturing. For example, the present invention may be used as a tool for semiconductor inspection of semiconductor integrated circuit devices and/or other similar fields.

Other features and advantages of the invention will become more readily understandable from the following detailed description and figures.

BRIEF DESCRIPTION OF THE FIGURES

The invention will be described in detail along with the following figures, in which like parts are denoted with like reference numerals or letters.

DETAILED DESCRIPTION OF THE INVENTION

To better understand the present invention, it is helpful to discuss an inherent shortcoming of the conventional laser cutting/ablation processes using a focused laser beam to remove a surface material on a small spot where the laser beam is focused on. In the conventional method, the ablation point and depth are controlled via changing the focus and moving a galvanizing mirror. The cutting or ablation progresses in a point-by-point manner, resulting in a slow and inefficient process. In some alternative applications, a simple mechanical mask has been used to project the laser on to the target. This however still result in an inefficient and highly inflexible system and process.

As will be demonstrated in the following representative embodiments, the present invention improves the existing laser ablation systems and methods by providing a laser material manipulation system that uses a laser imaging device having an array of controllable imaging elements. The laser imaging device receives the laser pulses emitted from the laser, forms a laser image through the controllable imaging elements, and projects the laser image onto a target material which needs to be manipulated. The projected laser image manipulates the material according to a desired manipulation pattern.

Disclosed below are representative embodiments of the systems and methods in accordance with the present inventions. The representative embodiments are disclosed herein for purposes of illustrating. The disclosed systems and methods should not be construed as limiting in any way. Instead, the present disclosure is directed toward all novel and nonobvious features and aspects of the various disclosed embodiments, alone and in various combinations and subcombinations with one another. Therefore, these and other variations upon the specific embodiments are intended to be covered by the present inventions. The systems and methods are not limited to any specific aspect or feature or combinations thereof, nor to the disclosed systems and methods require that any one or more specific advantages be present or problems be solved.

Figure 1:
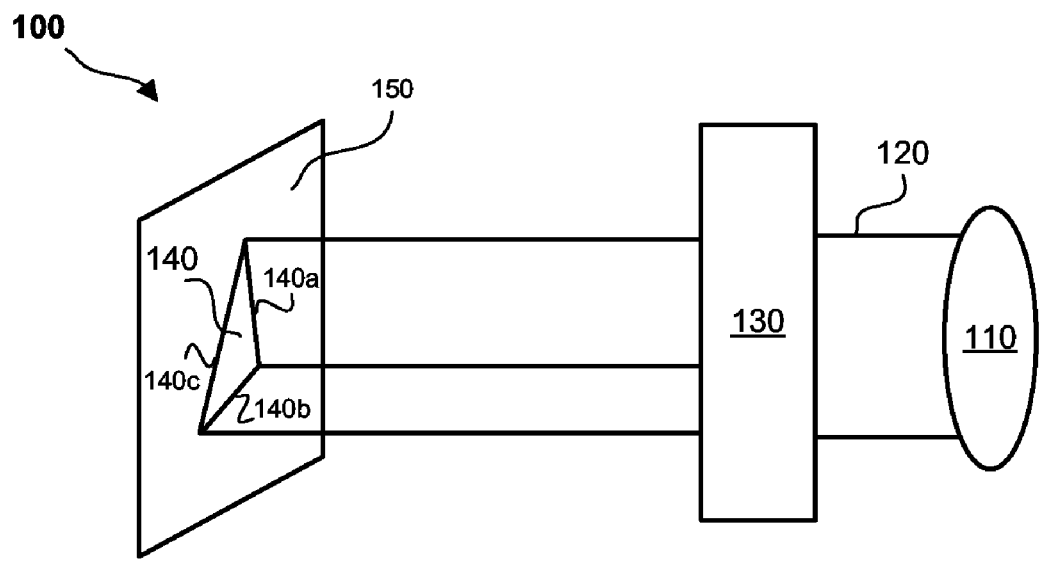
FIG. 1 is a block diagram showing the basic concept of the laser material manipulation system in accordance with the present invention.

1. An Embodiment of the Invention Demonstrating the General Aspects of the Invention FIG. 1 is a block diagram of an embodiment showing the basic concept of the laser material manipulation system in accordance with the present invention. Laser material manipulation system 100 comprises laser 110 and laser imaging device 130. Laser 110 emits laser pulses 120, which are received by laser imaging device 130 to form laser image 140. Laser imaging device 130, upon forming laser image 140, projects laser image 140 onto target material 150 that needs to be manipulated. With proper light intensity and material-laser interaction, the laser light constituting laser image 140 performs a desired manipulation on target material 150.

In this description, the term "image" refers to any pattern of a projected light showing a composite of traits, features, or a distribution of light intensity. A laser image in the present invention can have as simple as a single dot or spot of a focused light beam, but can consists of more complicated patterns including lines and area shapes. In the example shown in FIG. 1, the laser image 140 comprises a triangle defined by three line segments 140a, 140b and 140c forming boundaries thereof. To form an operative laser image 140, the laser pulses in the triangle area defined by the three line segments 140a, 140b and 140c have an operating light intensity, while the laser pulses outside of the triangle area have a non-operating light intensity. Herein, "operating light intensity" means a light intensity at a level or within a range of levels that is suitable for performing a desired manipulation on the target material. For example, for laser ablation of any given material, a minimum level of light intensity, called threshold light intensity, is required for ablation to occur. In the context of laser ablation, therefore, an operating light intensity is generally near or above the threshold light intensity for laser ablation of the target material, while a non-operating light intensity is generally substantially lower than the threshold light intensity for laser ablation of the target material.

In a simple configuration, the area of the illustrative triangle constituting laser image 140 is "bright" (i.e., shed by the laser pulses), while the areas outside of the triangle boundaries are "dark" (i.e., not shed by the laser pulses). Accordingly, the bright area (the triangle 140) is ablated by the laser, while the dark areas are non-ablated.

The particular shape (triangle) of laser image 140 shown in FIG. 1 is only for the purpose of illustration. In an application of the present invention, laser image 140 can be of any shape or pattern depending on the desired laser manipulation to be performed on target material 150.

Laser pulses 120 generated by laser 110 can be a variety of laser pulses depending on the applications. For laser ablation, and certain other applications, femtosecond laser is preferred. Femtosecond laser source and its applications in connection with the present invention will be further described in a later section of this description.

Laser imaging device 130 may be any imaging device suitable for forming a laser image. Although shown in FIG. 1 to be transmissive (in which the incident light comes from one side of the imaging device and the outgoing light forming the image is projected from an opposite side), laser imaging device 130 may be also be reflective (in which the incident light and the outgoing light are on the same side of the imaging device), or a transmissive/reflective combination (such as transflective).

Figure 2:
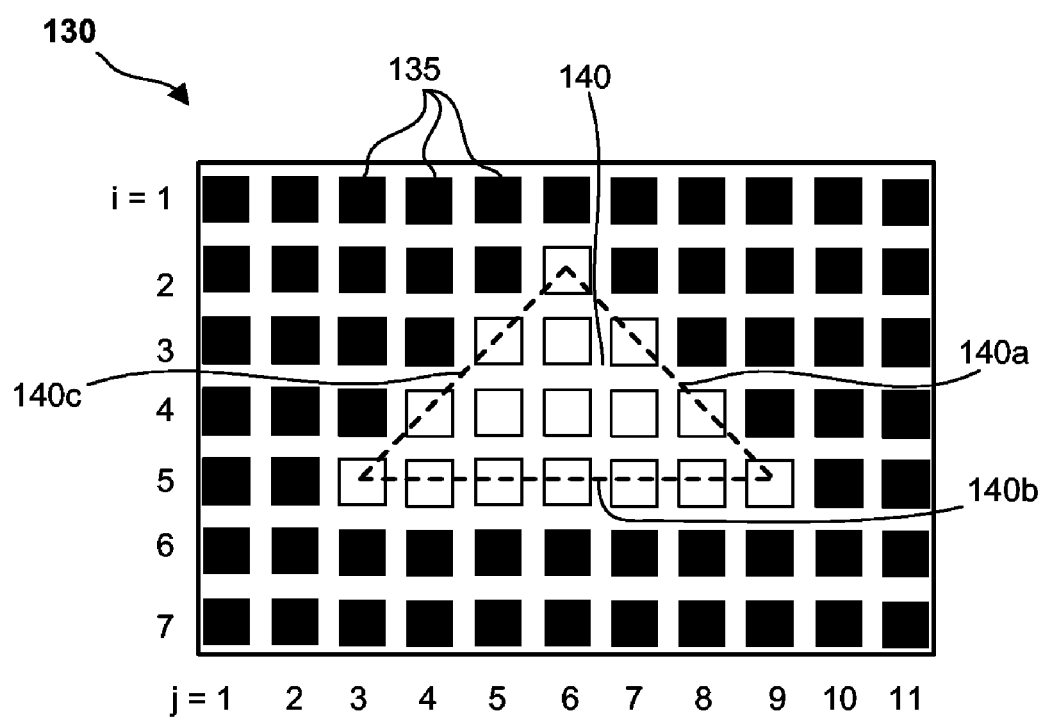
FIG. 2 is a schematic view of an exemplary laser imaging device used in a laser material manipulation system in accordance with the present invention.

FIG. 2 is a schematic view of an exemplary laser imaging device 130. Generally, laser imaging device 130 has an array of controllable imaging elements 135 each constituting a pixel, as familiar in imaging technology. Preferably, the controllable imaging elements 135 are individually controllable. And more preferably, controllable imaging elements 135 are addressable by an addressing controller as commonly known in display technologies. In order to function as a pixel element that interacts with an incident light to modulate or modify the incident light, each controllable imaging element 135 should have at least two different statuses, each status effectuating a distinctive optical effect on a laser pulse interacting with the controllable imaging element 135. In the simplest form, the two different statuses may be characterized as "on" or "off" in which the controllable imaging element 135 either passes or blocks the incident light, respectively. As shown in FIG. 2, each controllable imaging element 135 demonstrates two distinctive statuses with respect to an incident laser light. In the first status which is indicated in black, the controllable imaging element 135 blocks the incident laser light. In the second status which is indicated in white, the controllable imaging element 135 lets the incident laser light pass through. By individually and selectively controlling the status of each controllable imaging element 135, an image can be formed. In the particular example shown in FIG. 2, the controllable imaging elements 135 in white together form a laser image having an exemplary triangle shape.

Preferably, laser imaging device 130 may either comprise a liquid crystal display (LCD) or a digital micromirror device (DMD) as in digital light processing (DLP) technology. In each case (LCD or DMD), each imaging element 135 may correspond to a single pixel, or a group of pixels. The exemplary imaging devices which may be used for laser imaging in accordance with the present invention will be further discussed in a later section in this description.

Using a laser image to perform laser material manipulation according to some embodiments of the present invention may potentially have significant advantages over the conventional laser cutting or ablation. Conventional laser cutting or ablation processes uses focused laser beam to remove the surface material on the small spot where the laser beam focused. The ablation point and depth are controlled via changing of focus and moving of a galvanizing mirror. The cutting or ablation progresses in a point-by-point manner. This results in a slow and inefficient process. In contrast, with a laser image formed according to a desired material manipulation pattern, the material manipulation (e.g., cutting or ablation) is performed systematically and simultaneously in a manner that is much faster and more efficient than a point-by-point process. Depending on the type of the laser image formed, the material manipulation can be performed line by line, shape by shape, or area by area.

Furthermore, because the present invention uses a laser imaging device that has controllable imaging elements (such as addressable image pixels), the forming of the laser image is highly flexible and can be of very high resolution.

2. Other Exemplary Embodiments

Embodiments further enhancing the basic embodiment shown in FIG. 1 can be made.

Figure 3:
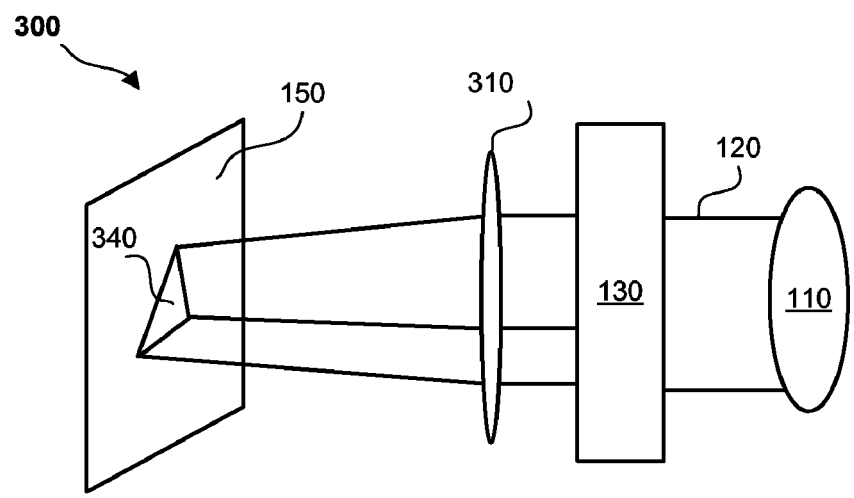
FIG. 3 is a block diagram showing a laser material manipulation system having an optical focusing unit according to an exemplary embodiment of the present invention.

FIG. 3 is a block diagram showing a laser material manipulation system 300 according to an exemplary embodiment of the present invention. Laser material manipulation system 300 is similar to laser material system 100 in FIG. 1, both including laser 110 producing laser pulses 120 which are formed into a laser image by laser imaging device 130. Laser material manipulation system 300 additionally has optical system 310 to further process the laser image formed by laser imaging device 130 before the laser image is projected onto target material 150. In the particular example shown in FIG. 3, optical system 310 is an optical focusing lens to form laser image 340 of a reduced size compared to that of laser image 140 in FIG. 1 when projected to target material 150. This reduction of the projected image size can be used to increase image area resolution, or reduce the size of the minimum feature that can be laser manipulated on target whatever 150. Smaller sizes of the minimum feature may be desirable in applications such as laser machining, laser device editing, microstructure inspection, MEMS fabrication, fabrication and prototype design (FPD), nanotechnology developments, and semiconductor manufacturing.

The size of the minimum feature firstly relates to the size of an individual image element 135 in imaging device 130. For example, when a LCD is used for imaging device 130, the size of the minimum feature relates to the pixel size of the LCD. Without optical reduction using optical system 310, the size of the minimum feature manipulatable on target material 150 would be about the same as a pixel size of the LCD. For instance, if the pixel size of the LCD is about 10 μm×10 μm, the size of the minimum feature manipulatable on target whatever 150 would also be close to 10 μm×10 μm. With optical system 310, however, the size of the minimum feature can be reduced many times (e.g., 10×, 50×, 100×, or more, if desired). Combined with the decreasing pixel size made possible with the developments in display technologies, the laser material manipulation system in accordance with the present invention can be used to handle sub-micro features.

Although image size reduction is often desired for processes involving microstructures as discussed above, optics for magnification may also be used in optical system 310 to enlarge the laser image projected onto a target material if desired.

Figure 4:
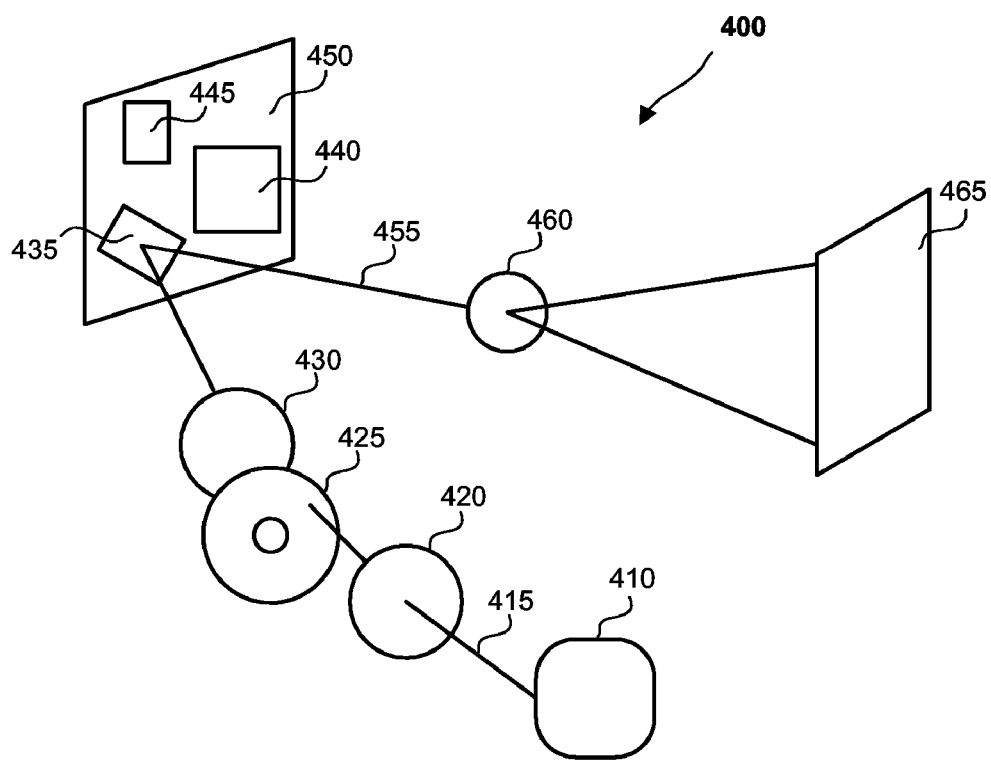
FIG. 4 is a block diagram showing a laser material manipulation system in accordance with an exemplary embodiment of the present invention.

FIG. 4 is a block diagram showing a laser material manipulation system 400 in accordance with another exemplary embodiment of the present invention. Compared to FIGS. 1 and 3, FIG. 4 shows more components. Laser material manipulation system 400 has laser 410 generating laser pulses 415, which pass through pre-imaging optics including condensing lens 420, filter 425 and shaping lens 430 to reach laser imaging device 435. FIG. 4 further shows memory device 440 and digital processor 445 supplementing imaging device 435, all placed on the imaging device board 450. Imaging device 435 forms a laser image as represented by outgoing laser light 455, which passes through optics system 460 and is projected onto target material 465.

Memory device 440 and digital processor 445 are used for signal processing, which may be needed for controlling the process of forming images, as commonly known in image or display technologies using addressable multiple image elements (pixels).

As shown in FIG. 4, imaging device 435 is reflective, in contrast to imaging device 130 (FIGS. 1 and 3) which is shown to be transmissive. In general, either reflective imaging devices or transmissive imaging devices may be used in the present invention. For example, either transmissive LCD or reflective DLP having a DMD can be used.

3. A Dual Beam Design Combining Laser Imaging and SEM

Figure 5:
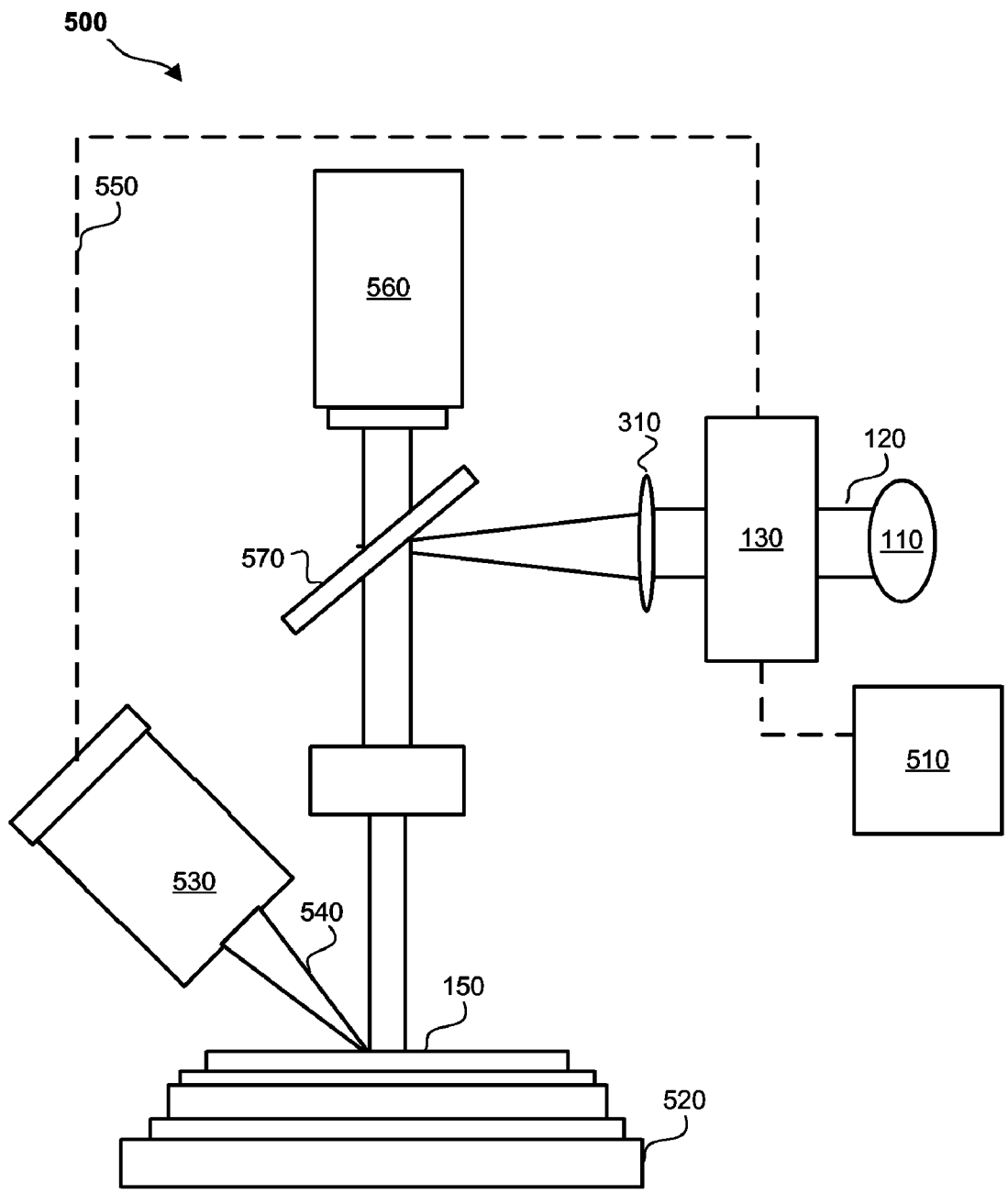
FIG. 5 is a block diagram of a laser material manipulation system including an SEM material inspection tool and a feedback loop in an exemplary embodiment of the present invention.

FIG. 5 is a block diagram of a laser material manipulation system 500 including Scanning Electron Microscope (SEM) 530 as a material inspection tool and feedback loop 550 in an exemplary embodiment of the present invention. SEM 530 uses electron beam 540 to scan the surface of target material 150 and collect material composition information thereof. This dual beam system can be used as an inspection or manufacturing tool in semiconductor industry, MEMS, FPD, nanotechnology and other technologies involving small-scale structures.

Similar to laser material manipulation system 300 in FIG. 3, laser material manipulation system 500 also has laser 110 emitting laser pulses 120, which pass through laser imaging device 130 and optical system of 310 to form a laser image (not shown) to be projected to target material 150 supported on stage 520. In addition, FIG. 5 shows that laser imaging device 130 is supplemented by image pattern module 510, which may either be an integral part of laser imaging device 130 or a separate unit. Image pattern module stores and inputs desired laser manipulation patterns to imaging device 130. For example, in laser micromachining or laser ablation, desired milling patterns are stored in image pattern module 510 and input to imaging device 130. Imaging device 130 in turn forms the desired image according to the pattern, and projects the image to target material 150 for material manipulation.

Meanwhile, imaging device 130 receives an electron beam (e-beam) image feedback signal from SEM 530 to further control the forming of the laser image. The e-beam image feedback signal contains material composition information on the scanned surface of target material 150. For certain material manipulation processes, such as laser ablation, the material composition information may be crucial because the threshold light intensity is material dependent.

With the feedback material composition information, laser imaging device 130 adjusts, if necessary, the light intensity of the image being formed. The inspection, feedback and image formation may be dynamic and performed in real time.

The adjustment of the laser intensity of the projected image may use a variety of suitable schemes. In one embodiment, the adjustment of the laser intensity is pixel specific. That is, the intensity at each pixel point of the image is adjusted according to target material 150. The material manipulation (e.g., ablation) is done according to the material distribution on target material 150. For example, the laser material manipulation system 500 can turn off the laser intensity of a certain image element (pixel) on imaging device 130 so that there would be no ablation at the corresponding point on target material 150, but turn on or increase the laser intensity of another image element (pixel) to mill away material at the corresponding point.

The milling depth can also be controlled by a controlling pulsing rate and/or pulse intensity. Milling depth control is particularly important for target materials such as semiconductor devices that have a layered construction because improper milling depth poses a threat to damage an underlying layer which is not meant to be ablated. The system and method of the present invention provide proper means to control the ablation process (milling process) such that the upper surface of the target material can be removed without disturbing the underlying layer. As will be further illustrated in the following section "Image generation, projection and control", the feedback signal from the inspection tool SEM 530 may be used to control pulsing rate and/or pulse intensity, and to determine when to stop ablation.

Furthermore, the image control, the ablation feature size control, laser intensity control, and milling depth control can also be performed dynamically according to a real-time feedback from the inspection tool SEM 540. With a digital processor such as digital processor 445 shown in FIG. 4, the above-mentioned controls may also be done digitally.

FIG. 5 also shows optical microscope 560 used in combination of the dual-beam design of laser material manipulation system 500. Optical microscope 560 provides supplemental inspection and monitoring of the system on a larger scale. To accommodate the light paths of optical microscope 560 and laser pulses 120, an optical beam splitter 570 is used.

4. Image Generation, Projection and Control

As illustrated above, the present invention uses a projected laser image on a target material (e.g. 150) to perform laser material manipulation according to a desired pattern. In laser ablation, for example, the image is based on the desired locations of laser ablation and the necessary or preferred laser intensity at each location. The selection of the desired locations of laser ablation is a user selection depending on the actual applications. For example, given a surface of a target material, if the user application requires that a certain area of certain shape and size needs to be removed, that area including its boundaries defines the locations of laser ablation.

In addition to the shape (or pattern) of the projected laser image that determines the locations of laser ablation, another aspect of the ablation process is the desired depth of milling. In some applications, the desired depth of milling may change as different locations of laser ablation because of, for example, area variations of a layered structure. The milling depth (or any other laser manipulation rate such as deposition rate) that can be produced during a certain period of time relates to the laser intensity and also depends on the properties of the target material. Variations of the target material distribution can lead to different ablation depths or deposition rates at different locations.

Furthermore, the necessary or preferred laser intensity for the ablation to occur at each location also relates to the material properties at that location. For example, each material may have its characteristic threshold laser intensity for ablation to occur, and as a result the laser intensity needs to be at or above a certain operating level (a threshold) for ablation to occur. In addition to the threshold requirement, the laser intensity may also need to be optimized for smoothest laser manipulation. According to some studies, a femtosecond laser of less than 0.2 $J/cm^2$ Fluence per pulse can result a smooth surface on a uniform material. If the Fluence of the laser is larger than 0.2 $J/cm^2$ yet less than 2.3 $J/cm^2$ per pulse, the ablated surface will be a rough surface even if the original material is uniformly distributed. Re-deposition occurs if the Fluence of the laser is larger than 2.3 $J/cm^2$. Because the Fluence of the laser can be controlled by focusing the laser beam or changing the laser intensity variation, the ablation depth may also be controlled by doing the same.

For the foregoing reasons, there is a need for controlling both the shape of the projected laser image and the laser intensity. In accordance with the present invention, the control may be done according to an observed laser manipulation effect and/or knowledge of the material distribution of the target material. As illustrated below, this need is met by introducing inspection tools such as an SEM module, feedback control ability and programming capability into the laser manipulation system of the present invention. The inspection tools help to characterize the target material, and together with the feedback control ability and the programming capability, achieve proper laser material manipulation (such as ablation and deposition).

As shown in FIG. 2, in one embodiment the imaging device (e.g., 130) of the laser material manipulation system in accordance with the present invention has an array of controllable imaging elements 135 comprising a two-dimensional grid consisted of N×M controllable imaging elements. Each controllable imaging element 135 is identified by a pair of coordinates i and j (i=1, 2, ... N; and j=1, 2, ... M).

According to one aspect of the present invention, an LCD or DLP like device using a laser light source instead of a typical light source can be used as laser imaging device 130. The imaging device can be controlled using video/image generating circuitry to allow laser beam to pass or be reflected.

In one embodiment, in order to control the locations of laser ablation and corresponding laser intensity, a two-dimensional material distribution chart is constructed. The material distribution chart together with a pre-established laser-material interaction characteristic matrix, superimposed with the intended laser manipulation pattern, creates the intended image on the image generating and projecting module.

In the above described embodiment, the projected laser image is described by a N ×M pixel matrix, each pixel corresponding to one of the controllable imaging elements and having a light intensity determined by:

$$F_{ij}=Q_{ij}(M)\times A_{ij},$$

wherein $Q_{ij}(M)$ is a material factor related to a material distribution and a corresponding material-laser interaction coefficient, and $A_{ij}$ is a manipulation pattern factor determined by a desired manipulation pattern on the target material (e.g., 150). The material factor $Q_{ij}(M)$ is determined, either experimentally or theoretically (or a combination thereof), based on a material distribution and a corresponding material-laser interaction coefficient. For example, $Q_{ij}(M)$ may be calculated, or approximately estimated, using a physics model based on the material's chemical structure and bounding forces.

In one embodiment, the material factor $Q_{ij}(M)$ can be selectable from a plurality of values predetermined of pre-known materials involved and the corresponding material-laser interaction coefficients. For example, in a semiconductor manufacture application, a target material usually would have Si, TiN, Cu, Al, photo-resists, and glasses. If it has been determined that there are three possible materials Si, Cu and TiN present in a particular target material (e.g., an IC chip), for example, and each material has a corresponding material factor $Q_{ij}(Si)$, $Q_{ij}(Cu)$, or $Q_{ij}(TiN)$, respectively, $Q_{ij}(M)$ may be selected to be one of the these three material factors according to a result from SEM for each pixel (ij) scanned by SEM.

Where multiple materials are involved in a single laser manipulation location (corresponding to a single pixel in the laser image 140), the multiple materials can be treated as an empirical compound material with one empirical material factor $Qij$(Compound). The empirical compound needs not to be a real chemical compound. Its material factor $Q_{ij}$(Compound) can be based on experimental data, and is real only in an empirical sense. $Q_{ij}(M)$, including $Q_{ij}$(Compound), may further be adjusted dynamically during laser manipulation. For example, if the laser does not perform a proper removal at the first laser pulse for ablation, the system can adjust the $Q_{ij}(M)$ to modify the light intensity on the second pulse to insure that ablation is enabled with the second laser pulse.

The above manipulation pattern factor $A_{ij}$ is determined by the desired manipulation (e.g., ablation or milling) pattern on the target material. In one embodiment, has a value of either 0 or 1, with 0 corresponding to "no milling" and 1 corresponding to "milling". In another embodiment, manipulation pattern factor $A_{ij}$ is determined by:

$$A_{ij}=P_{ij}\times f_{ij}$$

where $P_{ij}$ is a pure laser manipulation pattern factor describing the desired image pattern (and may have a value of either 0 or 1 as in the last embodiment), while $f_{ij}$ is an alteration factor to take into account any aberrations or non-uniformity of the laser beam. Such non-uniformity could arise due to the laser wave front profile being not uniform from the source, or due to non-uniformity among the pixels of the imaging device 130 (e.g., DLP or LCD). In such cases of non-uniformity, $f_{ij}$ may be used to compensate the non-uniformity.

Together, $A_{ij}$ and $Q_{ij}(M)$ determined the specific desired laser intensity for each pixel (ij) corresponding to a milling point on the target material.

In one embodiment, the material factor $Q_{ij}(M)$ determined according to $Q_{ij}(M)=M_{ij}\times I_{ij}$, wherein $M_{ij}$ is the material distribution and $I_{ij}$ is the corresponding material-laser interaction coefficient. Accordingly, the specific laser intensity $F_{ij}$ for pixel (ij) is determined according to:

$$F_{ij}=M_{ij}\times I_{ij}\times A_{ij},$$

where $F_{ij}$ stands for the laser intensity needed, $M_{ij}$ stands for the material distribution determined by pre-known materials involved and SEM scanning results, $I_{ij}$ stands for the laser-material interaction coefficient which is an experimental data, and $A_{ij}$ represents the desired shape and pattern, which in one embodiment can have the value of 1 or 0. This is just an exemplary embodiment of how the material factor $Q_{ij}(M)$ can be calculated. It is appreciated that there may be many other ways to incorporate the material factor $Q_{ij}(M)$ into the laser intensity.

With values for $F_{ij}$, which is the needed laser intensity at pixel (ij), the system then adjusts the laser intensity to realize the needed laser intensity at each pixel. The adjustment of laser intensity can be performed at various levels with different combinations. One root place to adjust light intensity is to change the global intensity of the laser beam before it reaches the imaging device 130 (e.g. LCD, or DLP). This can be done either within the laser source 110 or using external controls placed after the laser source 110. For example, a shutter and phase plate may be placed in between laser 110 and the imaging device 130. Since the laser is polarized to begin with, one can tune the laser intensity in a very fine scale by rotating the phase plate.

The adjustment of the global intensity, however, cannot individually control the lights density of separate pixels. The light intensity adjustment at individual pixel levels may be done in imaging device 130. In those embodiments that use LCD or DLP for imaging device 130, for example, it is appreciated that such adjustment at individual pixel levels can be easily done.

5. The Enabling Technologies

Several technologies, such as LCD, DLP, DMD, SEM, and femtosecond laser, may be used for the implementation of the present invention. These technologies are briefly described below.

(a) LCD

Liquid crystal displays (LCD) have been widely used to display various contents (texts and images) using visible light. LCDs are particularly popular as consumer products such as computer screens and TVs. LCDs generally use nematic phase liquid crystals to generate images. Just as there are many varieties of solids and liquids, there is also a variety of liquid crystal substances. Depending on the temperature and particular nature of a substance, liquid crystals can be in one of several distinct phases. Liquid crystals in the nematic phase are most commonly used for LCDs. One feature of liquid crystals is that they are affected by electric current. A particular type of nematic liquid crystal, called twisted nematics (TN), for example, is naturally twisted, but will be untwisted when an electric current is applied. Applying an electric current to these liquid crystals will untwist them to varying degrees, depending on the current's voltage. This change of the status (specifically a molecular orientation in this case) of the liquid crystal according to an applied signal (an electric current in this case) is the basis for LCD. At a different molecular orientation, a liquid crystal changes its transparency or transmittance to a polarized light. This transparency may vary from zero to close to 100%. Liquid crystals used in LCDs react predictably to electric current in such a way as to control light passage. When multiple pixels each having a certain amount of liquid crystal are individually controlled by the applied signal, a display of an image is made possible.

Although LCDs are conventionally uses as displays illuminated by non-coherent (non-laser) visible continuous wave lights, it is an aspect of the present invention to use a LCD display to form images using coherent light pulses (laser pulses) in a laser manipulation system in accordance with the present invention.

(b) DLP and DMD

Digital Light Processing (DLP) technology using digital micromirror devices (DMD) is a rapidly developing new technology for digital displays. Each device consists of more than multiple individually addressable micromirrors. Each mirror may be used as a pixel in a DLP based display. DLP based on the DMD has been used in such diverse products as projection displays with film-like projected images and photographic-quality printers. According to some reports, reliability testing of the DMD has demonstrated greater than 100,000 operating hours and more than 1 trillion mirror cycles. The DLP technology has been described in various literatures, for example in a paper entitled "Lifetime Estimates and Unique Failure Mechanisms of the Digital Micromirror Device" by M. R. Douglas, which paper is hereby incorporated by reference.

Because DLP is based on digital micromirror devices, a DLP display operates in a reflective mode. An application of a reflective display in the present invention is illustrated in FIG. 3. Although DLP is conventionally used as displays illuminated by non-coherent (non-laser) visible continuous wave lights, it is an aspect of the present invention to use a DLP display to form images using coherent light pulses (laser pulses) in a laser manipulation system in accordance with the present invention.

(c) Femtosecond Laser

In general, the laser light source of the present invention is not limited to femtosecond lasers. For laser ablation of certain materials, however, femtosecond laser is preferred. In general, laser ablation is a process of removing atoms of a target material by ionizing the atoms using the laser. With older lasers such as picosecond laser or laser with even longer pulses, a typical problem associated with laser ablation is the heat generated during the process. Femtosecond laser either alleviates or almost entirely eliminates the heat problem as discussed below.

Femtosecond laser has a pulse width (pulse duration) less than 200 femtoseconds (fs), which is much shorter than the typical electron cooling time (about 1000 femtoseconds or 1 picosecond). Thus as long as the pulsing rate of the laser is not faster than 1 GHz, the target material would have time to dissipate the heat generated by the laser. This diminishes the degree and the size of the zone affected by heat. Preferably, femtosecond laser is pulsed at less than 100 MHz. According to some embodiments of the present invention, femtosecond laser is pulsed at less than 100 Hz to accommodate data collection and feedback of an SEM. At this low pulse rate, experiments have proven that the zones affected by heat are almost nonexistent and the temperature variation is negligible, typically less than one degree Celsius. With such small heat-affected zone and negligible temperature variation, the target material of underlying structure operated on by the laser will remain intact, and be preserved for further uses or investigations.

In addition to laser ablation, femtosecond laser may also be used for laser deposition. In laser deposition, the material to be deposited is brought in to the environment as liquid or gases. Similar to that in focused ion beam (FIB) techniques, the material is heated and delivered via a needle to the intended proximity. The laser then causes the atoms or molecules to be ionized and attached to the material surface.

An example of femtosecond laser is Hurricane femtosecond laser manufactured by Spectra-Physics, a solid-state laser company in Mountain View California. Hurricane femtosecond laser is a diode-pumped ultrafast Ti:Sapphire laser having a pulse width smaller than 130 fs, and an output greater than 1 mJ at 1 kHz. The laser operates at the wavelength between 780-820 nm, with a beam diameter of 6 mm (nominal) at $1/e^2$.

Femtosecond laser is a developing technology with new and improved lasers continue to come out. More recent femtosecond laser is capable of producing a pulse duration shorter than 45 fs. Even sub-femtosecond laser is becoming available. All these developments may be used in accordance with the present invention.

(d) SEM

Scanning Electron Microscope (SEM) is an imaging tool to view material distribution and spacing. SEM functions similarly to its optical counterparts except that SEM uses a focused beam of electrons instead of light to "image" the targeted material (specimen) and gain information as to its structure and material composition. In an SEM, a stream of electrons is formed (by an electron source) and accelerated toward the target material using a positive electrical potential. This stream is confined and focused using metal apertures and magnetic lenses into a thin, focused, monochromatic beam. The SEM uses a magnetic lens to further focus high energy electrons into a small beam spot onto the target material. Together with a deflecting field, the electron beam scans the target and interacts (mostly through scattering) with the target material. As a result of the interaction between these high energy electron and target material, the target material emits backscattered electrons and secondary electrons. The collections of the backscattered electrons and/or secondary electrons reveal the information of the target material.

As described herein, the material composition or distribution information collected by the SEM is then used to adjust the laser intensity in accordance with the present invention.

6. Applications of the Present Invention

The laser material manipulation system and method in accordance with the present invention has a broad range of applications. It can be used in processes such as laser ablation, and particularly for small scale processes, such as semiconductor inspection, device editing, microsystem modification, sample preparation and MEMS manufacturing. For example, the laser material ablation system and method may be used in dynamic MEMS fabrication, especially in smaller dimensions, such as sub-micron features, to easily change device design and gain more flexibility on the design. It is appreciated that various features disclosed in connection with the embodiments may be used either individually or jointly.

According to some embodiments of the present invention, the laser manipulation system uses modules to generate and project dynamic images using femtosecond laser pulses to perform material manipulation (such as laser ablation or deposition). This provides a new technique in the laser cutting or laser milling arena at small scales such as micron scale. Unlike other laser cutting equipment, the laser ablation system and method in accordance with some embodiments of the present invention is capable to perform precise pulse control to prevent heat generation and thus does not leave streaks of melted materials covering any point of interest. The system and method in accordance with some embodiments of the present invention further does not clutter the surface for any future process, such as inspection or a manufacturing process. This is particularly suited for semiconductor defect inspection, especially embedded defects, and semiconductor underlayer studies.

When combined with SEM inspection tool generating feedback signals based on material distribution of the target material, the system and the method can dynamically generate laser patterns (images) on the fly for laser manipulation such as ablation (cutting or milling) or deposition, allowing more controls and more flexibility on semiconductor or MEMS inspection and or fabrication. These embodiments of the present invention offer several advantages over the existing dual beam systems using Focus Ion Beam (hereafter FIB) to perform a cutting operation on a target material. First, unlike FIB which performs a slow point-by-point milling process, the laser ablation system and method according to the present invention is capable of performing a simultaneous milling process over an entire selected area. The image or pattern-based laser ablation can proceed line by line, shape by shape, or area by area, depending on how the laser image is formed. This results in a much faster milling process. For a milling process that would typically take minutes for the existing FIB technique to complete, it may take just a few seconds for the system and method according to some embodiments of the present invention. Second, FIB tends to leave Gallium ions in the material after cutting, causing an often undesired change in the remaining target material. In contrast, the system or the method of laser ablation in accordance with the present invention can cut the target material without leaving any extra particles on the material. Third, while the existing FIB often has charging problems and causes interference with the e-beam of SEM, the system and method of the present invention can eliminate or alleviate these problems. Fourth, while the existing FIB often ends up damaging the structure underlying the target material, the laser ablation system and the method according to the present invention makes it much easier to leave the underlying structure intact. Finally, the conventional FIB cutting method has little or no real-time control over cutting depth, while the system and the method in accordance with some embodiments of the present invention offers milling thickness control even under non-uniform material distribution condition.

The above description, including the specification and drawings, is illustrative and not restrictive. Many variations of the invention will become apparent to those of skill in the art upon review of this disclosure. Various features and aspects of the above-described disclosure may be used individually or jointly. Further, the present disclosure can be utilized in any number of environments and applications beyond those described herein without departing from the broader spirit and scope of the specification. The scope of the invention should, therefore, be determined not with reference to the above description, but instead should be determined with reference to the appended claims along with their full scope of equivalents. In addition, it will be recognized that the terms "comprising," "including," and "having," as used herein, are specifically intended to be read as open-ended terms of art. The term "or" as used herein is not a logic operator in an exclusive sense unless explicitly described as such.

What is claimed is:

1. A laser system for processing selected target material comprising:

a laser for emitting pulses;

a laser imaging device operatively associated with said laser, having an array of plural, controllable imaging elements, operable collectively to form, from such pulses, a laser image which is projectable onto selected target material to be processed, each element being dynamically-variably, and controllably, interactible with pulses emitted from said laser, throughout a range of plural, distributed, different, independent, laser-beam/imaging-device-element interaction conditions, to create a range of plural, distributed, different, independent, laser-beam/target-material impingement-processing-point intensity values, with such intensity values being dependent collectively and combinedly on both an element-associated image manipulation pattern factor, and an element-associated material-laser-specific interaction coefficient, according to the formula $F_{ij}=Q_{ij} \times A_{ij}$, wherein (1) $F_{ij}$ is the impingement-intensity value at a specific target-material impingement processing point, (2) $Q_{ij}$ is a material factor related to (a) selected, target-material distribution on a processing-point-by-processing-point basis, and (b) a corresponding, specific, material-laser interaction coefficient associated with each such point, $Q_{ij}$ being expressed by the relationship $Q_{ij}=M_{ij} \times I_{ij}$, wherein $M_{ij}$ is the selected target-material distribution on a processing-point-by-processing-point basis and $I_{ij}$ is the corresponding material-laser interaction coefficient associated with each such a point, and (3) $A_{ij}$ is a manipulation pattern factor having a value of either only 0 or 1;

an inspection device operatively associated with said laser and said imaging device, adapted for monitoring, at each target-material processing point in the selected target material during processing, specific target-material composition at that point, and operable for producing signals relating to such monitoring; and an imaging controller forming part of a feedback loop operatively interposed said imaging and inspection devices, adapted to receive signals produced by said inspection device, and operable to produce dynamic adjustments of the projectable laser image through making dynamic, related, interactive-condition adjustments of elements in said imaging device according to signals received from said inspection device, and in accordance with the above-expressed formula $F_{ij}=Q_{ij} \times A_{ij}$.

2. The system of claim 1, wherein the emitted pulses are femtosecond pulses.

3. The system of claim 1, wherein the projected laser image is adapted for performing at least one of target-material laser ablation, other-material deposition, machining, and editing.

4. The system of claim 1, wherein the laser imaging device takes the form of one of a liquid crystal device, a digital micromirror device, and a digital light processing unit.

5. The system of claim 1, wherein said inspection device takes the form of a scanning electron microscope.

6. The system of claim 1, wherein said inspection device takes the form of an optical microscope.

* * * * *